US012626401B2

(12) United States Patent
Cao et al.

(10) Patent No.: US 12,626,401 B2
(45) Date of Patent: May 12, 2026

(54) METHOD AND SYSTEM FOR DETECTING POSITION RELATION BETWEEN VEHICLE AND LANE LINE, AND STORAGE MEDIUM

(71) Applicant: Guangzhou University, Guangzhou (CN)

(72) Inventors: Zhong Cao, Guangzhou (CN); Weijie Li, Guangzhou (CN); Wenli Shang, Guangzhou (CN); Wenjing Zhao, Guangzhou (CN); Sha Huan, Guangzhou (CN); Hai Jie, Guangzhou (CN)

(73) Assignee: Guangzhou University, Guangzhou (CN)

( * ) Notice: Subject to any disclaimer, the term of this patent is extended or adjusted under 35 U.S.C. 154(b) by 396 days.

(21) Appl. No.: 18/300,737

(22) Filed: Apr. 14, 2023

(65) Prior Publication Data

US 2023/0252677 A1 Aug. 10, 2023

Related U.S. Application Data

(63) Continuation of application No. PCT/CN2021/114250, filed on Aug. 24, 2021.

(30) Foreign Application Priority Data

Oct. 16, 2020 (CN) .......................... 202011107336.X

(51) Int. Cl.
G06T 7/73 (2017.01)
G06T 7/80 (2017.01)
(Continued)

(52) U.S. Cl.
CPC ................ G06T 7/75 (2017.01); G06V 10/25 (2022.01); G06V 10/30 (2022.01); G06V 20/588 (2022.01);
(Continued)

(58) Field of Classification Search
CPC ............. G06T 7/75; G06T 2207/20061; G06T 2207/30244; G06T 2207/30256;
(Continued)

(56) References Cited

U.S. PATENT DOCUMENTS 9,412,168 B2 * 8/2016 Shimizu .................... G06T 7/80
11,205,284 B2 * 12/2021 Dai ........................... G06T 7/80
(Continued)

FOREIGN PATENT DOCUMENTS

CN 104463935 A 3/2015
CN 104859563 A 8/2015
(Continued)

OTHER PUBLICATIONS

"Vehicle Surveillance with a Generic, Adaptive, 3D Vehicle Model," in IEEE Transactions on Pattern Analysis and Machine Intelligence, vol. 33, No. 7, pp. 1457-1469, Jul. 2011, doi: 10.1109/TPAMI.2010. 217. (Year: 2011).*
(Continued)

*Primary Examiner* — Gregory A Morse
*Assistant Examiner* — Ronde Lee Miller
(74) *Attorney, Agent, or Firm* — Hemisphere Law, PLLC

(57) ABSTRACT

A method for detecting the position relation between a vehicle and a lane line includes: obtaining a vehicle model, the vehicle model being represented by multiple first coordinates in a world coordinate system; obtaining a lane line image, the lane line image being captured by a camera disposed on a vehicle; obtaining a calibration parameter of the camera; determining, according to the lane line image and the calibration parameter, a first line segment of a lane line mapped into the world coordinate system; and determining the position relation between the lane line and the vehicle according to the position relation between the first line segment and multiple first coordinates in the world
(Continued)

coordinate system. The position relation between the lane line and the vehicle can be determined without using a positioning system, so that the construction cost of intelligent driving is reduced.

8 Claims, 8 Drawing Sheets

(51) Int. Cl.
| | |
|---|---|
| *G06V 10/25* | (2022.01) |
| *G06V 10/30* | (2022.01) |
| *G06V 10/48* | (2022.01) |
| *G06V 20/56* | (2022.01) |

(52) U.S. Cl.
CPC ............... *G06T 2207/20061* (2013.01); *G06T 2207/30244* (2013.01); *G06T 2207/30256* (2013.01)

(58) Field of Classification Search
CPC .. G06T 7/80; G06T 7/73; G06V 10/25; G06V 10/30; G06V 20/588; G06V 10/48
See application file for complete search history.

(56) References Cited

U.S. PATENT DOCUMENTS

| | | | | |
|---|---|---|---|---|
| 12,205,321 | B2 * | 1/2025 | Dai ........................... | G06T 7/74 |
| 2018/0365857 | A1 * | 12/2018 | Lee ......................... | G06T 7/536 |
| 2023/0252677 | A1 * | 8/2023 | Cao ........................... | G06T 7/73 |
| | | | | 382/104 |
| 2023/0326077 | A1 * | 10/2023 | Du ............................ | G06T 7/73 |

FOREIGN PATENT DOCUMENTS

| | | |
|---|---|---|
| CN | 108052908 A | 5/2018 |
| CN | 110956081 A | 4/2020 |

OTHER PUBLICATIONS

"Vehicle Localization Based on the Detection of Line Segments from Multi-Camera Images" (hereinafter Kosuke) in Journal of Robotics and Mechatronics, 2015, vol. 27, No. 6, pp. 617-626, doi: (Year: 2015).*

* cited by examiner

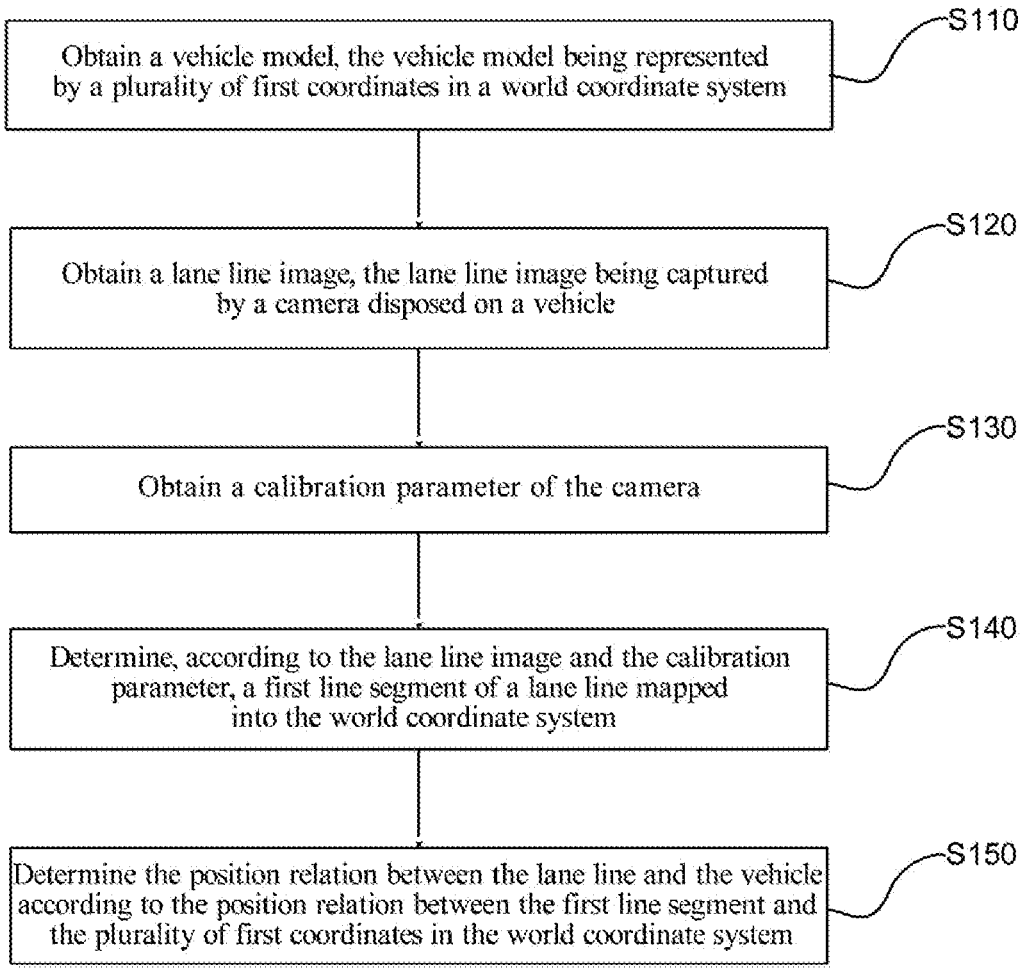

Obtain a vehicle model, the vehicle model being represented by a plurality of first coordinates in a world coordinate system ⌐S110

Obtain a lane line image, the lane line image being captured by a camera disposed on a vehicle ⌐S120

Obtain a calibration parameter of the camera ⌐S130

Determine, according to the lane line image and the calibration parameter, a first line segment of a lane line mapped into the world coordinate system ⌐S140

Determine the position relation between the lane line and the vehicle according to the position relation between the first line segment and the plurality of first coordinates in the world coordinate system ⌐S150

FIG. 1

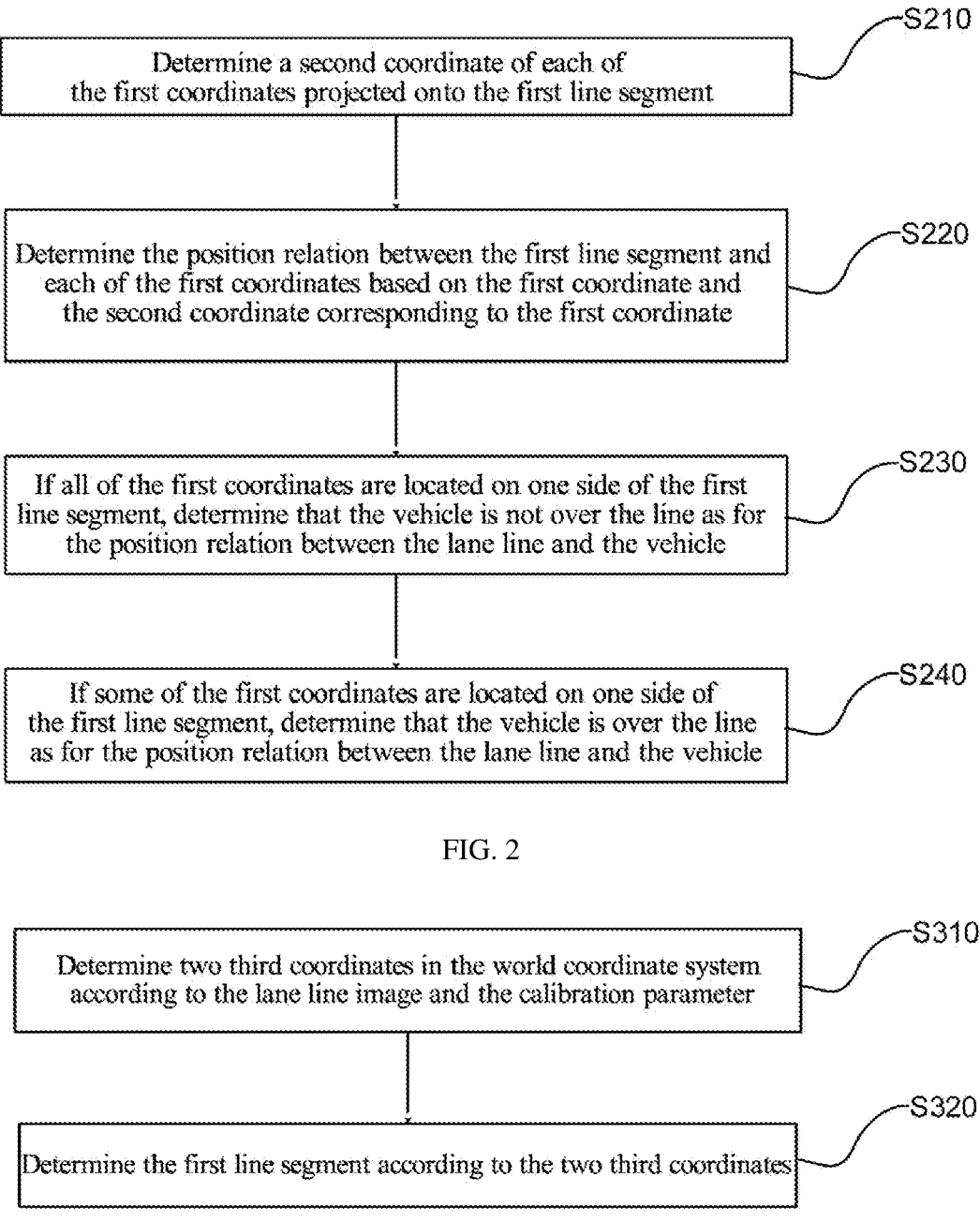

S210

Determine a second coordinate of each of
the first coordinates projected onto the first line segment

S220

Determine the position relation between the first line segment and
each of the first coordinates based on the first coordinate and
the second coordinate corresponding to the first coordinate

S230

If all of the first coordinates are located on one side of the first
line segment, determine that the vehicle is not over the line as for
the position relation between the lane line and the vehicle

S240

If some of the first coordinates are located on one side of
the first line segment, determine that the vehicle is over the line
as for the position relation between the lane line and the vehicle

Determine two third coordinates in the world coordinate system
according to the lane line image and the calibration parameter

S320

Determine the first line segment according to the two third coordinates

FIG. 3

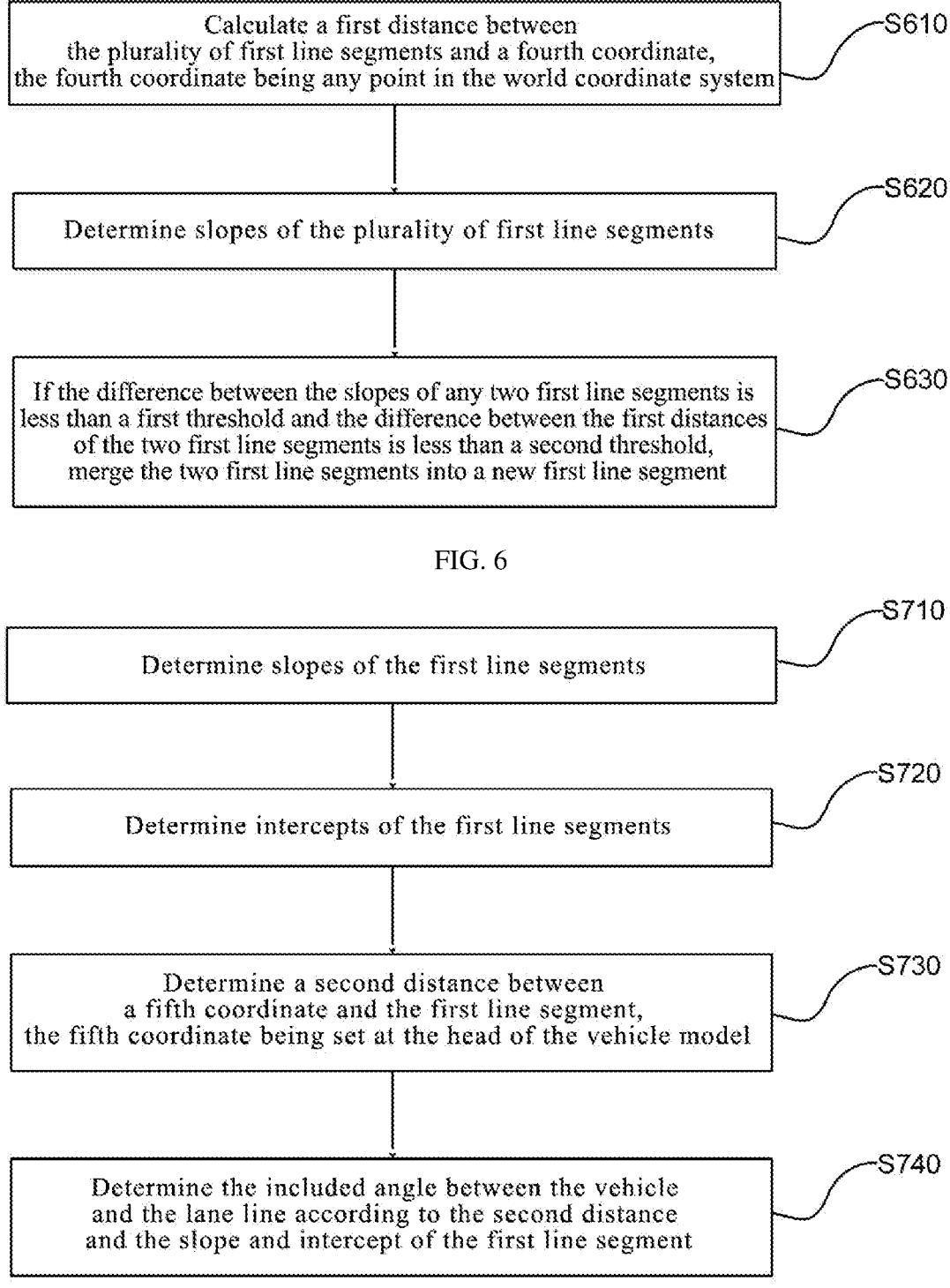

Calculate a first distance between
the plurality of first line segments and a fourth coordinate,
the fourth coordinate being any point in the world coordinate system
S610

Determine slopes of the plurality of first line segments
S620

If the difference between the slopes of any two first line segments is
less than a first threshold and the difference between the first distances
of the two first line segments is less than a second threshold,
merge the two first line segments into a new first line segment
S630

FIG. 6

Determine slopes of the first line segments
S710

Determine intercepts of the first line segments
S720

Determine a second distance between
a fifth coordinate and the first line segment,
the fifth coordinate being set at the head of the vehicle model
S730

Determine the included angle between the vehicle
and the lane line according to the second distance
and the slope and intercept of the first line segment
S740

FIG. 7

METHOD AND SYSTEM FOR DETECTING POSITION RELATION BETWEEN VEHICLE AND LANE LINE, AND STORAGE MEDIUM

TECHNICAL FIELD

The present invention relates to the field of intelligent driving, in particular to a method and system for detecting the position relation between a vehicle and a lane line, and a storage medium.

BACKGROUND

One of the reasons why drivers can drive normally is that they can judge whether the vehicle is driving normally based on the position of the lane lines on the road relative to the vehicle they are driving. For example, when driving on a straight road, drivers can see, through the front window, the position of the lane lines on both sides of the vehicle relative to the front window, so as to determine whether the vehicle is driving in the center of the lane; when reversing into a parking space, they may also need to observe, through the left and right side mirrors, the angle between the vehicle and the parking space line, so as to determine what an angle they should use to reverse the vehicle into the parking space. If manned driving is changed to unmanned driving, judging the position relation between the vehicle and the lane line will be the key to judging whether the vehicle can drive normally.

The common method for judging the position relation between the vehicle and the lane line is to use GPS or Beidou system, and install a positioning information receiver and vector-aided positioning equipment such as a gyroscope, an accelerometer and an electronic compass on the vehicle. In addition, it is necessary to obtain precise data such as the coordinates of the lane lines of a certain site in advance, and establish a site model, so as to precisely position the vehicle at the site, thereby judging the position relation between the vehicle and the lane line.

However, the adoption of a positioning system requires the large-scale laying of base stations to ensure the positioning precision, and the change of the site lane line requires the re-establishment of the site model, thus increasing the construction cost.

SUMMARY

In order to solve at least one of the above technical problems, the present invention provides a method and system for detecting the position relation between a vehicle and a lane line, and a storage medium; according to the detection method, the position relation between the lane line and the vehicle can be determined without using a positioning system, so that the construction cost of intelligent driving is reduced.

In a first aspect, the examples of the present invention provide a method for detecting the position relation between a vehicle and a lane line, which comprises the following steps:

obtaining a vehicle model, the vehicle model being represented by a plurality of first coordinates in a world coordinate system;

obtaining a lane line image, the lane line image being captured by a camera disposed on a vehicle;

obtaining a calibration parameter of the camera;

determining, according to the lane line image and the calibration parameter, a first line segment of a lane line mapped into the world coordinate system; and determining the position relation between the lane line and the vehicle according to the position relation between the first line segment and the plurality of first coordinates in the world coordinate system.

In some examples, the vehicle model is obtained through the following steps:

obtaining length and width information of the vehicle; and mapping the length and width information into the world coordinate system to obtain the vehicle model.

In some examples, the step of determining the position relation between the lane line and the vehicle according to the position relation between the first line segment and the plurality of first coordinates in the world coordinate system comprises the following steps:

determining a second coordinate of each of the first coordinates projected onto the first line segment;

determining the position relation between the first line segment and each of the first coordinates based on the first coordinate and the second coordinate corresponding to the first coordinate;

if all of the first coordinates are located on one side of the first line segment, determining that the vehicle is not over the line as for the position relation between the lane line and the vehicle; and if some of the first coordinates are located on one side of the first line segment, determining that the vehicle is over the line as for the position relation between the lane line and the vehicle.

In some examples, the step of determining, according to the lane line image and the calibration parameter, a first line segment of a lane line mapped into the world coordinate system comprises the following steps:

determining two third coordinates in the world coordinate system according to the lane line image and the calibration parameter; and determining the first line segment according to the two third coordinates.

In some examples, the step of determining two third coordinates in the world coordinate system according to the lane line image and the calibration parameter comprises the following steps:

determining a recognition region according to the lane line image;

determining a second line segment in the recognition region by using Hough transform;

determining image pixel coordinates of two endpoints of the second line segment according to the second line segment; and mapping the image pixel coordinates into the world coordinate system according to the calibration parameter to obtain the two third coordinates of the lane line in the world coordinate system.

In some examples, the step of determining a recognition region according to the lane line image comprises the following steps:

graying the lane line image to obtain a grayscale image;

filtering the grayscale image to obtain a noise reduction image;

performing distortion correction on the noise reduction image to obtain a corrected image;

performing edge detection on the corrected image to obtain image data; and substituting the image data into a recognition model to obtain the recognition region.

In some examples, the following steps are also included when the number of the recognized first line segment is two or more before the step of determining the position relation between the lane line and the vehicle according to the position relation between the first line segment and the plurality of first coordinates in the world coordinate system:

calculating a first distance between the plurality of first line segments and a fourth coordinate, the fourth coordinate being any point in the world coordinate system;

determining slopes of the plurality of first line segments; and if the difference between the slopes of any two first line segments is less than a first threshold and the difference between the first distances of the two first line segments is less than a second threshold, merging the two first line segments into a new first line segment.

In some examples, the head of the vehicle model is located at the origin of the world coordinate system, and its orientation is the same as the Y axis of the world coordinate system; the method for detecting the position relation between a vehicle and a lane line further comprises the following steps:

determining the slope of the first line segment;

determining the intercept of the first line segment;

determining a second distance between a fifth coordinate and the first line segment, the fifth coordinate being set at the head of the vehicle model; and determining the included angle between the vehicle and the lane line according to the second distance and the slope and intercept of the first line segment.

In a second aspect, the examples of the present invention further provide a system for detecting the position relation between a vehicle and a lane line, which comprises the following components:

a plurality of cameras, which are arranged on the vehicle for capturing the lane line image; and a processing component, which is used to acquire the lane line image, the calibration parameter of the camera, and the vehicle model, the vehicle model being represented by a plurality of first coordinates in a world coordinate system, the processing component determining, according to the lane line image and the calibration parameter, a first line segment of a lane line mapped into the world coordinate system and determining the position relation between the lane line and the vehicle according to the position relation between the first line segment and the plurality of first coordinates in the world coordinate system.

In a third aspect, the examples of the present invention further provide a computer-readable storage medium, which stores computer-executable instructions for causing a computer to execute the method for detecting the position relation between a vehicle and a lane line as described in the first aspect above.

The above technical solutions of the present invention have at least one of the following advantages or beneficial effects: Drawing a plurality of first coordinates in the world coordinate system to form a vehicle model; when it is necessary to judge the position of a lane line and a vehicle, obtaining the vehicle model, the calibration parameter of a camera disposed on the vehicle, and the lane line image captured by the camera; determining, according to the calibration parameter of the camera and the lane line image, a first line segment of the lane line mapped into the world coordinate system; and then determining the position relation between the lane line and the vehicle according to the position relation between the first line segment and the plurality of first coordinates in the world coordinate system. By uniformly mapping the real vehicle and the captured lane line images into the world coordinate system and determining the position relation between the lane line and the vehicle according to the vehicle model and the line segment in the world coordinate system, the position relation between the vehicle and the lane line can be determined only by the equipment of the vehicle itself without using a positioning system, so that the construction cost of intelligent driving is reduced.

BRIEF DESCRIPTION OF THE DRAWINGS

FIG. 1 is a flowchart of a method for detecting the position relation between a vehicle and a lane line according to an example of the present invention;

FIG. 2 is a flowchart of a method for detecting the position relation between a vehicle and a lane line according to another example of the present invention;

FIG. 3 is a flowchart of a method for detecting the position relation between a vehicle and a lane line according to another example of the present invention;

FIG. 6 is a flowchart of a method for detecting the position relation between a vehicle and a lane line according to another example of the present invention;

FIG. 7 is a flowchart of a method for detecting the position relation between a vehicle and a lane line according to another example of the present invention;

DETAILED DESCRIPTION OF THE EMBODIMENTS

The examples described in this application should not be considered as restrictions on this application. All other examples obtained by those of ordinary skill in the art without creative efforts shall fall within the protection scope of this application.

The following relates to "some examples", which refer to a subset of all possible examples; however, it is to be understood that the "some examples" may be of the same or a different subset of all possible examples, and may be combined with each other without conflict.

All technical and scientific terms used herein have the same meaning as commonly understood by those skilled in the art, unless otherwise defined. The terms used herein are only for the purpose of describing the examples of this application, and are not intended to limit this application.

The examples of the present invention provide a method for detecting the position relation between a vehicle and a lane line, which can determine the position relation between a vehicle and a lane line without using a positioning system, thereby reducing the construction cost of intelligent driving. As shown in FIG. 1, the method of the examples of the present invention includes, but is not limited to, steps S110, S120, S130 and S140.

Step S110: Obtaining a vehicle model, the vehicle model being represented by a plurality of first coordinates in a world coordinate system.

Figure 8:
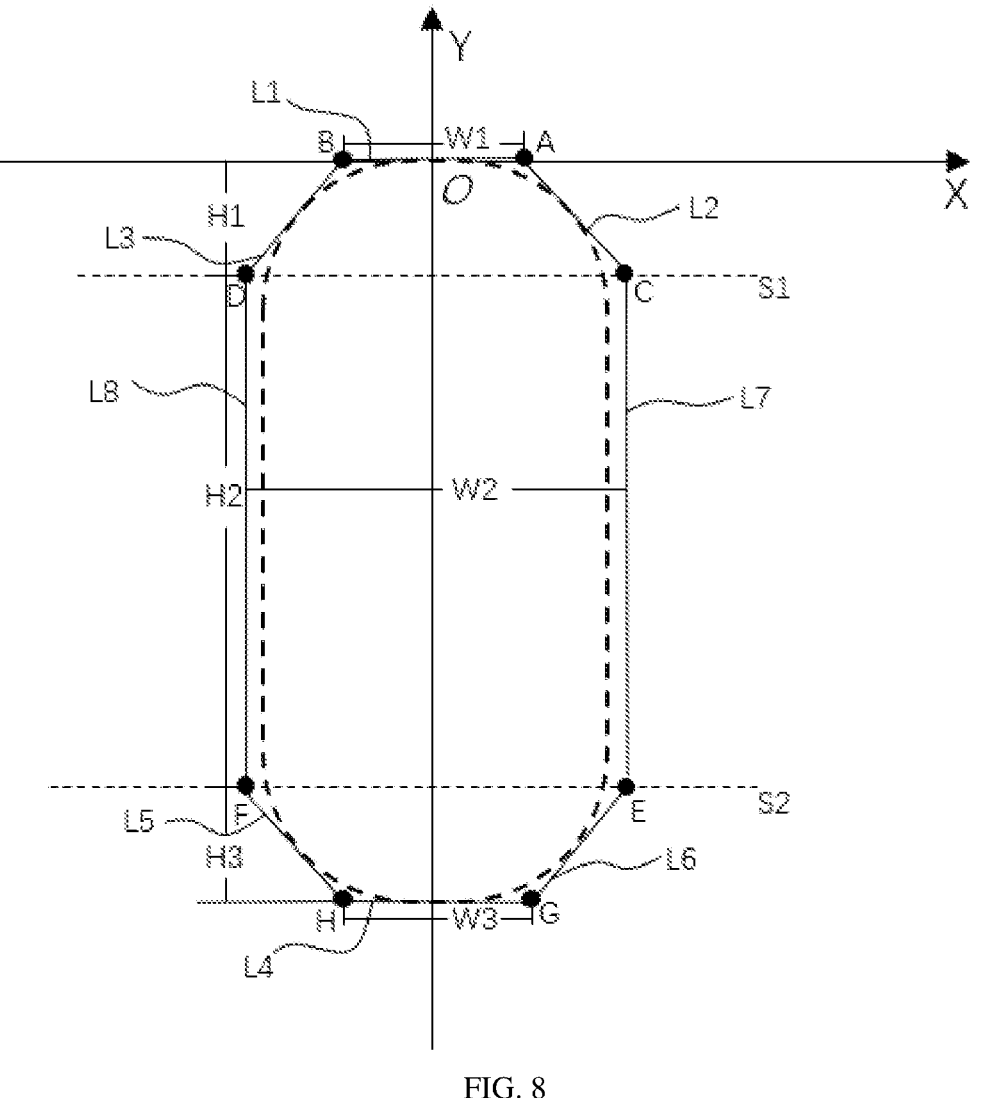
FIG. 8 is a schematic diagram of a vehicle model in the world coordinate system according to an example of the present invention.

In some examples, the method for obtaining a vehicle model is as follows:

obtaining length and width information of the vehicle: as shown in FIGS. 8, S1 and S2 are auxiliary lines, the auxiliary line S1 being used to identify the position where the width of the vehicle gradually increases just to the maximum width from the head, the auxiliary line S2 being used to identify the position where the width of the vehicle just gradually decreases from the maximum width; the three widths W1, W2 and W3 are measured, W1 being the front width, W2 the body width, and W3 the rear width; then the three lengths H1, H2 and H3 are measured, H1 being the distance from the head to the auxiliary line S1. H2 the distance between the auxiliary lines S1 and S2, and H3 being the distance from the auxiliary line S2 to the rear of the vehicle; the origin O of the world coordinate is set at the middle of the head, and the direction of the world coordinate system is perpendicular to the direction of the vehicle; and mapping the length and width information into the world coordinate system to obtain the vehicle model: the coordinate values of the first coordinates A, B, C, D, E, F, G and H can be determined according to the length and width information; a straight line set can be obtained by determining a straight line from two points, the straight line set including straight lines L1, L2, L3, L4, L5, L6, L7 and L8 that constitute the vehicle model representing the vehicle; it should be noted that, if the vehicle model is required to restore the vehicle better or the body shape of the vehicle is more complex, more straight lines can also be used to establish the vehicle model.

Step S120: Obtaining a lane line image, the lane line image being captured by a camera disposed on a vehicle.

In some examples, there may be one camera, which is set at the head with a shooting area in front of the vehicle; the camera can also be set on the side of the vehicle, with the shooting area by the side of the vehicle.

In some examples, there may also be multiple cameras, which are arranged around the vehicle with the shooting area surrounding the vehicle. For example, when there are four cameras, these cameras are arranged on the front, rear, left, and right of the vehicle, so that the road conditions around the vehicle can be captured with the fewest cameras to provide the surrounding lane line images. Of course, if the shooting area is insufficient, the number of cameras can also be increased.

Step S130: Obtaining a calibration parameter of the camera.

In some examples, the calibration parameter includes an internal parameter matrix, a rotation matrix, and a displacement matrix. The internal parameter matrix, as an important parameter for calculating the conversion relation between the image pixel coordinate system and the world coordinate system, can obtain the internal parameter matrix and distortion matrix of the camera through Zhang Zhengyou's calibration method, or directly obtain the same through the manual or the manufacturer, the distortion matrix being an important parameter for correcting a distorted image to obtain an undistorted image. When the image pixel coordinate system of the image captured by the camera is converted into the world coordinate system, the world coordinate system needs to be converted to coincide with the world coordinate system where the vehicle model is located before subsequent calculations can be made; during the conversion of the world coordinate system, the rotation matrix and displacement matrix of the camera can be obtained.

In some examples, the rotation matrix and displacement matrix of the camera can be calculated using a five-point method, in which, when the world coordinates and image pixel coordinates of five points are known, four points of them are used as pose estimation parameters, and the remaining one point is used as a reference point for judging whether the pose estimation is accurate. With the internal parameter matrix and distortion matrix of the camera and the four points therein, the corresponding rotation matrix and displacement matrix of the camera can be deduced.

In some examples, as shown in FIG. 8, the origin O of the world coordinate system can be selected to be at the head, with the direction of the X axis of the world coordinate system perpendicular to the vehicle. It should be noted that the direction of the world coordinate system and the position of the origin O are selected only for the convenience of calculation. Every time the position of the camera changes, the rotation matrix and displacement matrix of the camera need to be re-determined.

Step S140: Determining, according to the lane line image and the calibration parameter, a first line segment of the lane line mapped into the world coordinate system.

In some examples, after being captured by the camera, an image is sent to the processing component; after recognizing that the image is a lane line image, the processing component processes the lane line image, and then maps the lane line into the world coordinate system in combination with the calibration parameter of the camera to obtain a first line segment. In the world coordinate system, a straight line set formed by a plurality of first coordinates represents a vehicle model, and the first line segment represents the lane line.

It should be noted that, since the lane line has a certain width, there will be two line segments representing the edge of the lane line after the lane line image is recognized, and the line segment close to one side of the vehicle model can be selected as the first line segment in the converted world coordinate system.

Step S150: Determining the position relation between the lane line and the vehicle according to the position relation between the first line segment and the plurality of first coordinates in the world coordinate system.

In some examples, with the first line segment in the world coordinate system corresponding to a function expression, according to the function expression of the first line segment and the first coordinate, the position relation between the first line segment and the vehicle model in the world coordinate system can be judged, and then the position relation between the lane and the vehicle can be judged, thereby judging whether the vehicle driving meets the specifications, for example, whether the vehicle is over the line.

Another example of the present invention also provides a method for detecting the position relation between a vehicle and a lane line. This may refer to FIG. 2, which is a schematic diagram of an example of the refinement process of step S150 in FIG. 1, step S150 including but being not limited to steps S210, S220, S230 and S240.

Step S210: Determining a second coordinate of each of the first coordinates projected onto the first line segment.

Step S220: Determining the position relation between the first line segment and each of the first coordinates based on the first coordinate and the second coordinate corresponding to the first coordinate.

Step S230: If all of the first coordinates are located on one side of the first line segment, determining that the vehicle is not over the line as for the position relation between the lane line and the vehicle.

Step S240: If some of the first coordinates are located on one side of the first line segment, determining that the vehicle is over the line as for the position relation between the lane line and the vehicle.

Figure 9:
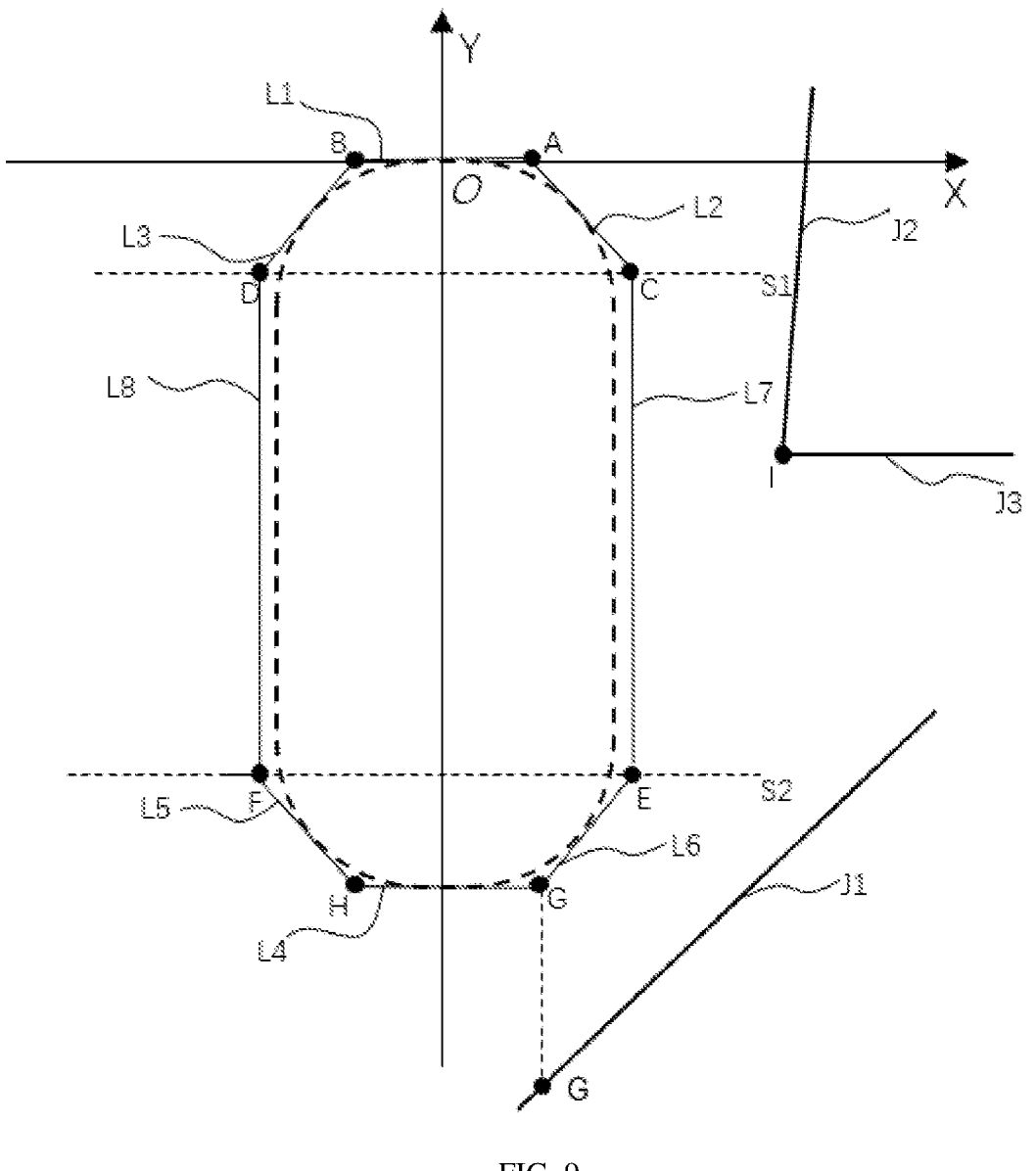
FIG. 9 is a schematic diagram of the position relation between the vehicle model and the first line segment in the world coordinate system according to an example of the present invention.

In some examples, as shown in FIG. 9, the lane line is mapped into the world coordinate system and represented by the first line segment J1, and the second coordinate G' is the projection of the first coordinate G on the first line segment J1. The ordinate of the second coordinate G' can be obtained by the following formula:

$Y_{G'} = k_{j1} X_{G} + b_{j1}$, where $Y_{G'}$ is the ordinate of the second coordinate G', $k_{j1}$ is the slope of the first line segment J1, $b_{j1}$ is the intercept of the first line segment J1, and $X_{G}$ is the abscissa of the first coordinate G. Further, the position of the first coordinate G relative to the second coordinate G' can be judged according to the size relation between the ordinate $Y_{G'}$ of the second coordinate G' and the ordinate $Y_{G}$ of the first coordinate G, and then the position of the first coordinate G relative to the first line segment J1 can be judged. The position of the first coordinate G relative to the first line segment J1 is judged as follows:

when $Y_{G} > Y_{G'}$, the second coordinate G' is located above the first coordinate G, that is, the first coordinate G is located below the first line segment J1;

when $Y_{G} < Y_{G'}$, the second coordinate G' is located below the first coordinate G, that is, the first coordinate G is located above the first line segment J1; and when $Y_{G} = Y_{G'}$, the second coordinate G' coincides with the first coordinate G, that is, the first coordinate G is on the first line segment J1.

After the position of each of the first coordinates relative to the first line segment is judged, the position relation between the lane line and the vehicle can be judged as follows:

when all of the first coordinates are located on one side of the first line segment with the first line segment not passing through the vehicle model, the vehicle is not over the line; and when some of the first coordinates are located on one side of the first line segment with the first line segment passing through the vehicle model, the vehicle is over the line.

Specifically, the situation that some of the first coordinates are located on one side of the first line segment can be further divided into the following cases: When some of the first coordinates are located on one side of the first line segment and another some of the first coordinates are located on the other side of the first line segment, it is judged that the lane line passes through the vehicle; and when some of the first coordinates are located on one side of the first line segment and the remaining first coordinates are located on the first line segment, it is judged that the vehicle is just over the lane line.

It should be noted that when the absolute value of the slope of the first line segment exceeds a slope threshold (e.g. the slope threshold is 1), the first line segment is basically located on the left or right side of the vehicle model, the relation between the abscissa of the first coordinate and the abscissa of the second coordinate projected onto the first line segment by the first coordinate can be determined, and the position relation between the lane line and the vehicle can also be obtained.

In some examples, when the vehicle is reversed into a parking space, two lane lines may intersect to form an included angle, which is mapped into the world coordinate system; as shown in FIG. 9, the intersection of the first line segment J2 and the first line segment J3 forms an included angle. The way to judge whether the vehicle is over the angle is specifically as follows: The coordinates of the intersection point I can be obtained according to the function expression of the first line segments J2 and J3; and it is judged whether the intersection point I is inside the vehicle model according to the intersection point I and the straight line set representing the vehicle model, thereby judging whether the vehicle is over the angle.

Another example of the present invention also provides a method for detecting the position relation between a vehicle and a lane line. This may refer to FIG. 3, which is a schematic diagram of an example of the refinement process of step S140 in FIG. 1, step S140 including but being not limited to steps S310 and S320.

Step S310: Determining two third coordinates in the world coordinate system according to the lane line image and the calibration parameter.

Step S320: Determining the first line segment according to the two third coordinates.

In some examples, with the calibration parameter, the image pixel coordinate system in the lane line image can be converted into the world coordinate system; since the lane line in reality is a straight line, the lane line captured by the camera will have a certain length; the two endpoints of the lane line are mapped into the world coordinate system to obtain two third coordinates, which are connected to obtain the first line segment representing the lane line. With the characteristic that the lane line is a straight line, only two third coordinates in the world coordinate system need to be determined to map the lane line into the world coordinate system, thereby reducing the amount of calculation and improving the calculation speed.

Another example of the present invention also provides a method for detecting the position relation between a vehicle and a lane line. This may refer to FIG. 4, which is a schematic diagram of an example of the refinement process of step S310 in FIG. 3, step S310 including but being not limited to steps S410, S420, S430 and S440.

Step S410: Determining a recognition region according to the lane line image.

Step S420: Determining a second line segment in the recognition region by using Hough transform.

Step S430: Determining image pixel coordinates of two endpoints of the second line segment according to the second line segment.

Step S440: Mapping the image pixel coordinates into the world coordinate system according to the calibration parameter to obtain the two third coordinates of the lane line in the world coordinate system.

In some examples, the recognition region can be determined after image processing on the captured lane line images. The following formulas are used to calculate the coordinates of the upper left corner of the recognition region:

$$X_u = X_0 - W/2;$$

$Y_u = Y_0 - H/2;$ where $X_0$ is the abscissa of the center point of the recognition region, $Y_0$ is the ordinate of the center point of the recognition region, W is the width of the recognition region, H is the height of the recognition region, $X_u$ is the abscissa of the endpoint of the upper left corner of the recognition region, and $Y_u$ is the ordinate of the endpoint of the upper left corner of the recognition region.

Since the lane line is a straight line, the straight line in the recognition region, i.e. the second line segment, can be found using Hough transform. The two endpoints of the second line segment in the recognition region are converted into image pixel coordinates. This conversion can be carried out in the following way:

$$X_1 = X_u + X_{u1};$$

$Y_1 = Y_u + Y_{u1};$ where $X_{u1}$ is the abscissa of an endpoint of the second line segment in the recognition region, $Y_{u1}$ is the ordinate of an endpoint of the second line segment in the recognition region, $X_1$ is the abscissa of the image pixel of an endpoint of the second line segment, and $Y_1$ is the ordinate of the image pixel of an endpoint of the second line segment.

After being obtained, the image pixel coordinates are converted into world coordinates according to a conversion formula. The conversion formula used is as follows:

$$Z_c \begin{bmatrix} u \\ v \\ 1 \end{bmatrix} = \begin{bmatrix} cmx & 0 & u_0 & 0 \\ 0 & cmy & v_0 & 0 \\ 0 & 0 & 1 & 0 \end{bmatrix} \begin{bmatrix} R & T \\ \vec{0} & 1 \end{bmatrix} \begin{bmatrix} X_w \\ Y_w \\ Z_w \\ 1 \end{bmatrix},$$

and where $$camera\_matrix = \begin{bmatrix} cmx & 0 & u_0 & 0 \\ 0 & cmy & v_0 & 0 \\ 0 & 0 & 1 & 0 \end{bmatrix}$$

is the internal parameter matrix, R is the rotation matrix, T is the displacement vector, $Z_c$ is the scale factor, u and v are the image pixel coordinates, $X_w$, $Y_w$ and $Z_w$ are the world coordinates; with the lane line as a two-dimensional space on the ground, $Z_w = 0$, from which the scale factor $Z_c$ can be obtained.

In the internal parameter matrix, the calculation formulas of cmx and cmy are as follows:

$$cmx = \frac{f}{dx};$$

$$cmy = \frac{f}{dy};$$

where f is the focal length of the camera, and dx and dy are the actual lengths of a pixel on the X axis and Y axis of the photosensitive plate coordinate system in the image pixel coordinate system.

Another example of the present invention also provides a method for detecting the position relation between a vehicle and a lane line. This may refer to FIG. 5, which is a schematic diagram of an example of the refinement process of step S410 in FIG. 4, step S410 including but being not limited to steps S510, S520, S530, S540 and S550.

Step S510: Graying the lane line image to obtain a grayscale image.

In some examples, after being grayed, the lane line image can better display the color gradient, which is beneficial to the subsequent image processing.

Step S520: Filtering the grayscale image to obtain a noise reduction image.

In some examples, filtering the image can filter out most of the Gaussian noise in the image, such as dust, raindrops, etc., and setting the Gaussian kernel to an appropriate size allows adaptation to different environmental conditions.

Step S530: Performing distortion correction on the noise reduction image to obtain a corrected image.

In some examples, the actual lane line will be distorted to a certain extent in the image captured by the camera, so it is necessary to correct the distortion of the image. The corrected image after the distortion correction is an image without distortion, which can provide image pixel coordinates more accurately, the distortion correction requiring the internal parameter matrix and distortion matrix of the camera.

Step S540: Performing edge detection on the corrected image to obtain image data.

In some examples, the canny operator can be used to detect the edge of the image, and the edge detection graph can well reflect the edge situation of an object.

Step S550: Substituting the image data into a recognition model to obtain the recognition region.

In some examples, image data are obtained after a series of processing on the lane line image, and are then substituted into the recognition model to obtain the recognition region.

It should be noted that the recognition model may also include recognizing solid and dashed lane lines; the recognition model can first collect image samples, and then label the image samples with labeling software to form a training file; the training file is inputted into the deep neural network for training, thereby obtaining the recognition model. The deep learning network can be selected from target detection deep learning frameworks such as Yolov3 and SSD, as long as it can recognize the solid and dashed lines in the image and output the recognition type and recognition region. Of course, the recognition model can also output the length and width of the recognition region and recognize the coordinates of the center point.

It should be noted that when the recognition types are different, the parameters of Hough transform need to be adjusted, which is caused by the different distributions of the solid and dashed lines in the image space. With the solid line appearing as a large continuous segment in the image while the dashed line as multiple small non-continuous segments, if the same parameters are used to recognize the solid and dashed lines, there may be cases where two or more straight lines are recognized when a solid line is subjected to recognition, or no straight line is recognized when a dashed line is subjected to recognition.

Another example of the present invention also provides a method for detecting the position relation between a vehicle and a lane line. This may refer to FIG. 6, which is a schematic diagram of another example in FIG. 1. When one lane line is mapped into the world coordinate system to obtain a plurality of first line segments, steps S610, S620 and S630 are performed before step S150.

Step S610: Calculating a first distance between the plurality of first line segments and a fourth coordinate, the fourth coordinate being any point in the world coordinate system.

Step S620: Determining slopes of the plurality of first line segments.

Step S630: If the difference between the slopes of any two first line segments is less than a first threshold and the difference between the first distances of the two first line segments is less than a second threshold, merging the two first line segments into a new first line segment.

Figure 10:
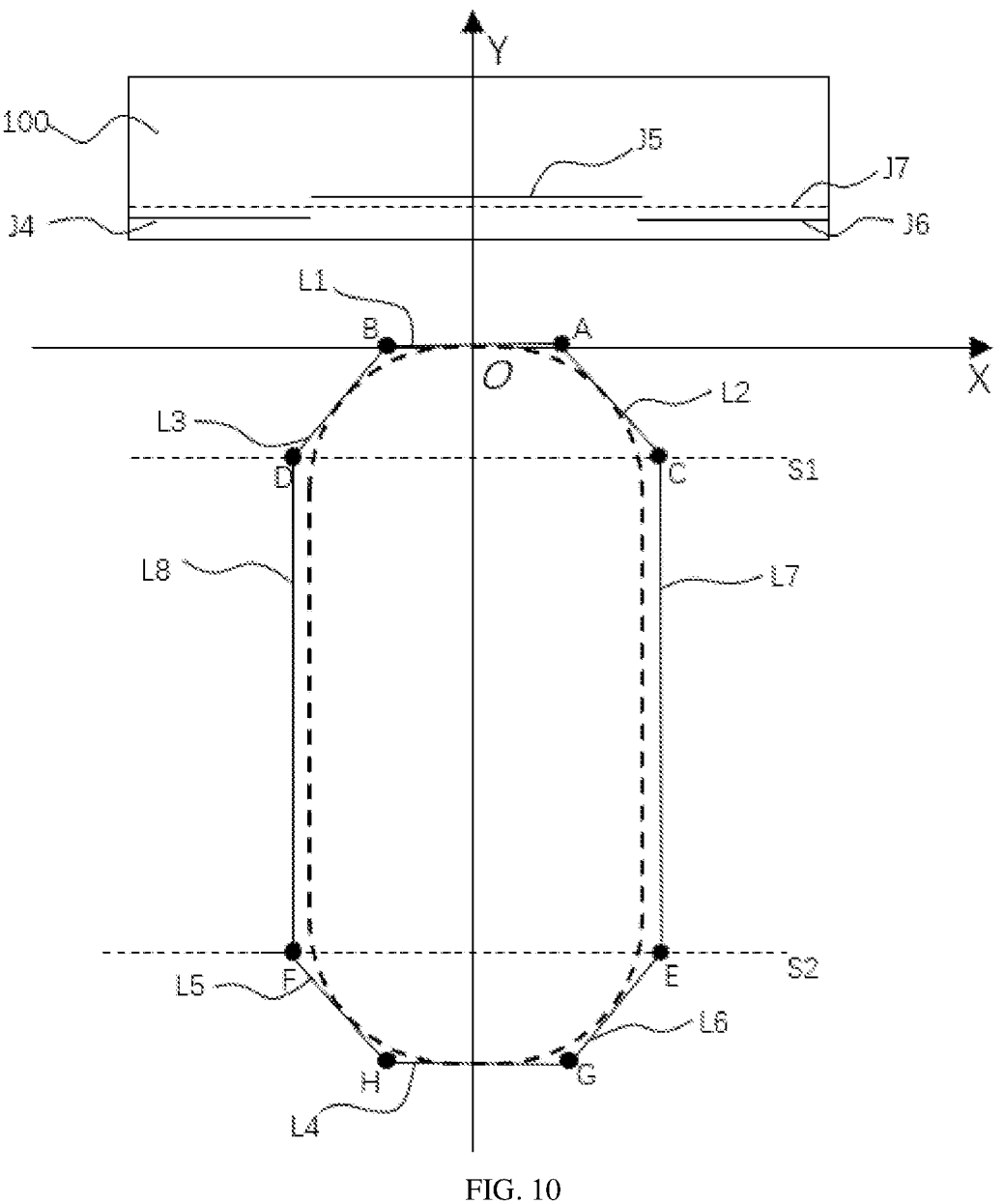
FIG. 10 is a schematic diagram of the first line segment fitted in the world coordinate system according to an example of the present invention.

In some examples, a plurality of first line segments may be mapped from the same lane line in a lane line image. As shown in FIG. 10, in the same recognition region 100, the first line segments J4, J5 and J6 may be on the same straight line; however, due to the low image resolution, environment, parameter setting and other reasons, the straight line is recognized as multiple straight lines; therefore, the first line segments J4, J5 and J6 need to be fitted into a new first line segment J7. First, it is necessary to judge whether these first line segments are the same first line segment, which can be carried out according to the slope of the first line segment and the first distance between the fourth coordinate and the plurality of first line segments, the fourth coordinate of this example being selected as the coordinate origin O. When the difference between the slopes of the plurality of first line segments is within the first threshold, it can be determined that the directions of these first line segments are the same; further, when the difference between the first distances is within the second threshold, it can be determined that these first line segments are actually the same line segment, and then straight line fitting is performed on these line segments. The specific fitting process is as follows: The average slope and average first distance of the first line segments determined to be the same line segment are obtained, and are used to fit a new first line segment to represent the lane line.

In some examples, after the first line segment is fitted in the same recognition region, different cameras may capture the same lane line; therefore, it is necessary to fit the first line segments mapped into the world coordinate system by the lane line images captured by multiple cameras, i.e., to fit the first line segments representing the same lane line in different recognition regions. Likewise, first it is necessary to judge whether these first line segments are the same first line segment, which can be carried out according to the slope of the first line segment and the first distance between the fourth coordinate and the plurality of first line segments, the fourth coordinate of this example being selected as the coordinate origin O. When the difference between the slopes of the plurality of first line segments is within the first threshold, it can be determined that the directions of these first line segments are the same; further, when the difference between the first distances is within the second threshold, it can be determined that these first line segments are actually the same line segment, and then straight line fitting is performed on these line segments. The specific fitting process is as follows: The average slope and average first distance of the first line segments determined to be the same line segment are obtained, and are used to fit a new first line segment to represent the lane line.

Another example of the present invention also provides a method for detecting the position relation between a vehicle and a lane line. This may refer to FIG. 7, which is a schematic diagram of another example in FIG. 1. The method for detecting the position relation between the vehicle and the lane line provided in this example includes, but is not limited to, steps S710, S720, S730 and S740.

Step S710: Determining slopes of the first line segments.

Step S720: Determining intercepts of the first line segments.

Step S730: Determining a second distance between a fifth coordinate and the first line segment, the fifth coordinate being set at the head of the vehicle model.

Step S740: Determining the included angle between the vehicle and the lane line according to the second distance and the slope and intercept of the first line segment.

Figure 11:
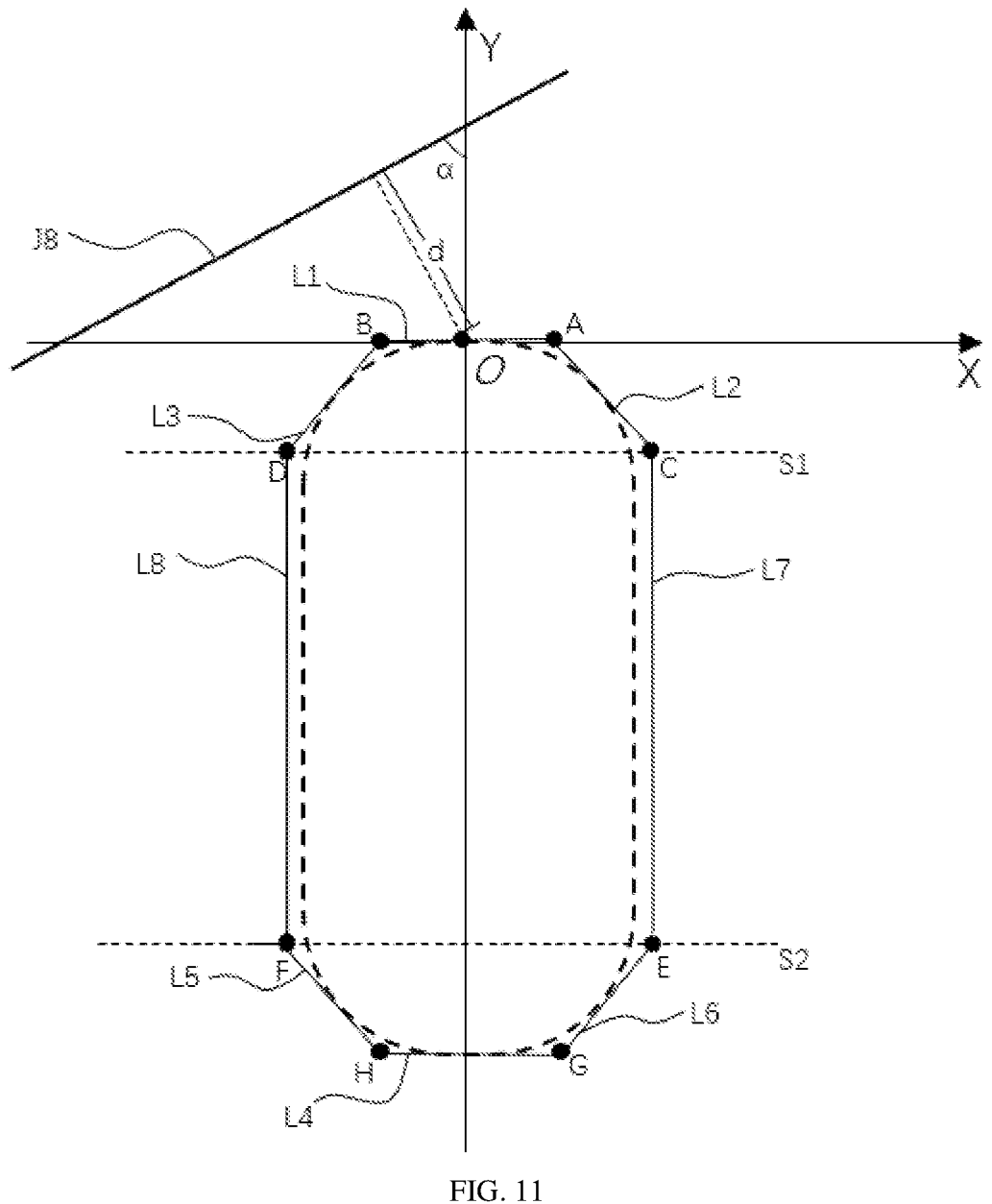
FIG. 11 is a schematic diagram of the position relation between the vehicle model and the first line segment in the world coordinate system according to an example of the present invention.

In some examples, as shown in FIG. 11, the slope and intercept of the first line segment J8 can be determined according to the two third coordinates; with the fifth coordinate representing the coordinate of the head and the head of the vehicle model set at the origin O, the fifth coordinate is the coordinate of the origin O; the orientation of the head of the vehicle model is the same as the Y axis of the world coordinate system, that is, the body of the vehicle model is perpendicular to the X axis of the world coordinate system. The distance d from the fifth coordinate to the first line segment J8 can be calculated according to the following formula of the distance from a point to a straight line:

$$d = \frac{|b_1|}{\sqrt{k_1^2 + 1}} = \sqrt{\frac{b_1^2}{k_1^2 + 1}},$$

where $b_1$ is the intercept of the first line segment J8, and $k_1$ is the slope of the first line segment J8.

The deflection angle $\alpha$ between the vehicle model and the first line segment J8 can be obtained according to the following formula:

$$\sin(\alpha) = \frac{d}{b_1};$$

$$\alpha = \arcsin\left(\frac{d}{b_1}\right).$$

The deflection angle between the vehicle and the lane line is calculated, and can be used to adjust the vehicle direction in time for correct driving.

It should be noted that the above method can also be used for the calculation of the deflection angle between the rear of the vehicle and the first line segment.

The examples of the present invention also provide a system for detecting the position relation between a vehicle and a lane line, which includes a processing component and several cameras. The camera is set on the vehicle to capture lane line images. The processing component is used to obtain the lane line images captured by the camera, the calibration parameter of the camera, and the vehicle model, the vehicle model being represented by a plurality of first coordinates in a world coordinate system, the processing component determining, according to the lane line image and the calibration parameter, a first line segment of a lane line mapped into the world coordinate system and determining the position relation between the lane line and the vehicle according to the position relation between the first line segment and the plurality of first coordinates in the world coordinate system.

Figures 4, 5:
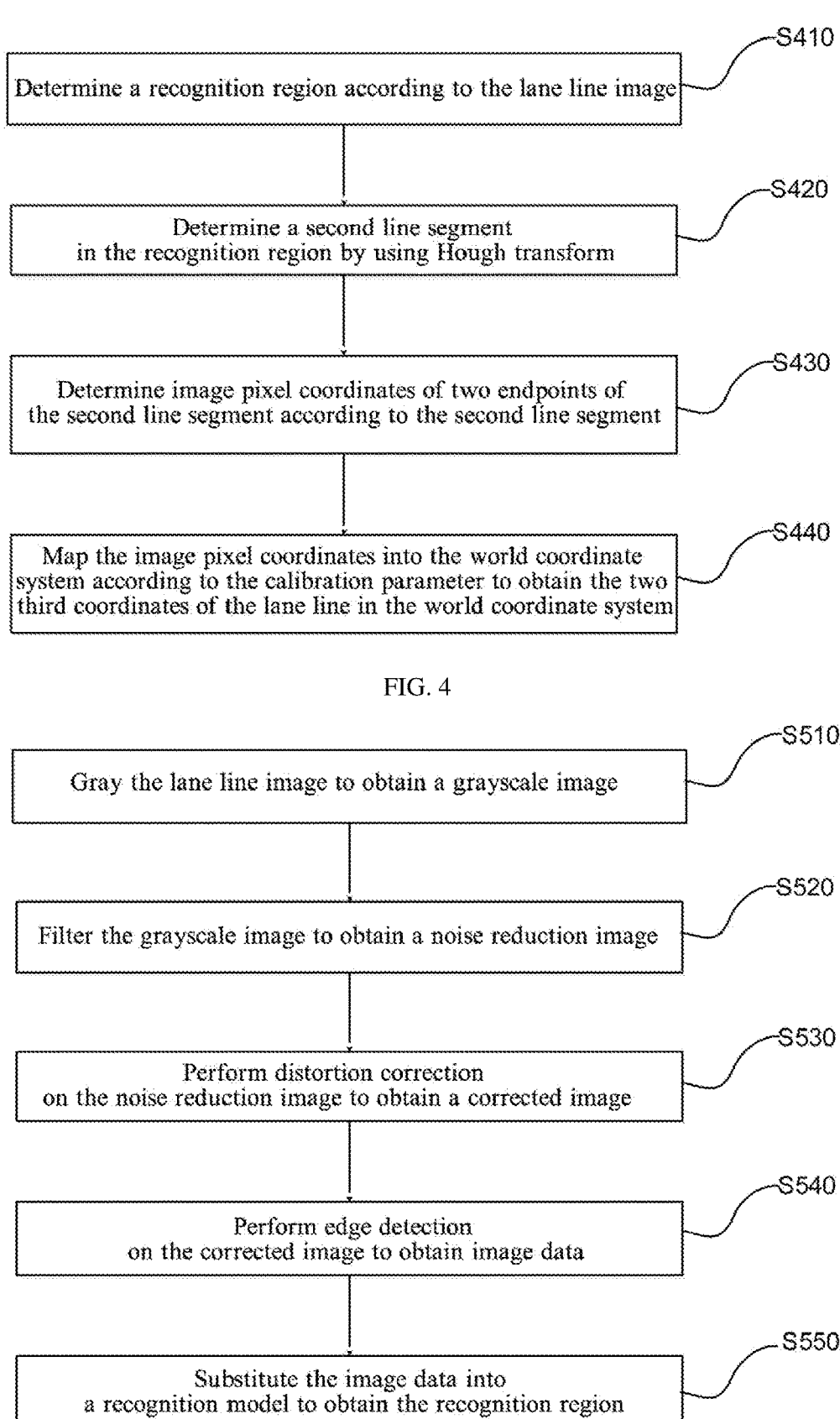
FIG. 4 is a flowchart of a method for detecting the position relation between a vehicle and a lane line according to another example of the present invention.
FIG. 5 is a flowchart of a method for detecting the position relation between a vehicle and a lane line according to another example of the present invention.

An example of the present invention also provides a computer-readable storage medium, which stores computer-executable instructions that are executed by one or more control processors, so as to execute, for example, the above-described steps S110 to S150 of the method in FIG. 1, steps S210 to S240 of the method in FIG. 2, steps S310 to S320 of the method in FIG. 3, steps S410 to S440 of the method in FIG. 4, steps S510 to S550 of the method in FIG. 5, steps S610 to S630 of the method in FIG. 6, and steps S710 to S740 of the method in FIG. 7.

Those of ordinary skill in the art can understand that all or some of the steps and systems in the methods disclosed above can be implemented as software, firmware, hardware, and appropriate combinations thereof. Some or all of the physical components may be implemented as software executed by a processor such as a central processing unit, a digital signal processor or a microprocessor, or as hardware, or as an integrated circuit such as an application specific integrated circuit. Such software may be distributed on a computer-readable medium, which may include a computer storage medium (or a non-temporary medium) and a communication medium (or a temporary medium). As is well known to those of ordinary skill in the art, the term "computer storage medium" includes volatile and non-volatile, removable and non-removable media implemented in any method or technology for storing information, such as computer-readable instructions, data structures, program modules or other data. The computer storage medium includes, but is not limited to, the following media: RAM, ROM, EEPROM, flash memory or other memory technologies; CD-ROM, Digital Versatile Disc (DVD) or other optical disk storage media; magnetic cassettes, magnetic tapes, magnetic disk storage or other magnetic storage devices; or any other media that can be used to store the desired information and can be accessed by a computer. In addition, the communication medium typically includes computer-readable instructions, data structures, program modules, or other data in modulated data signals such as carrier waves or other transport mechanisms, and can include any information delivery media, as is well known to those of ordinary skill in the art.

The preferred embodiments of the present invention have been specifically described above, but the present invention is not limited to the above-mentioned embodiments. Without departing from the spirit of the present invention, those skilled in the art can also make various equivalent modifications or substitutions, which are all included in the scope defined by the claims of the present invention.

What is claimed is:

1. A method for detecting a position relation between a vehicle and a lane line, characterized in that the method comprises the following steps:
obtaining a vehicle model, the vehicle model being represented by a plurality of first coordinates in a world coordinate system;
obtaining a lane line image, the lane line image being captured by a camera disposed on the vehicle;
obtaining a calibration parameter of the camera;
determining, according to the lane line image and the calibration parameter, at least one first line segment of the lane line mapped into the world coordinate system; and
determining the position relation between the lane line and the vehicle according to the position relation between the at least one first line segment and the plurality of first coordinates in the world coordinate system; and
wherein a head of the vehicle model is located at an origin of the world coordinate system, and an orientation of the head of the vehicle model is the same as the Y axis of the world coordinate system; and the method further comprises the following steps:
determining a slope of the at least one first line segment;
determining an intercept of the at least one first line segment;
determining a distance between a coordinate of the head of the vehicle model and the at least one first line segment; and
determining an included angle between the vehicle and the lane line according to the distance and the slope and intercept of the at least one first line segment.

2. The method for detecting the position relation between the vehicle and the lane line according to claim 1, characterized in that the vehicle model is obtained through the following steps:
obtaining length and width information of the vehicle; and
mapping the length and width information into the world coordinate system to obtain the vehicle model.

3. The method for detecting the position relation between the vehicle and the lane line according to claim 1, characterized in that the step of determining the position relation between the lane line and the vehicle according to the position relation between the at least one first line segment and the plurality of first coordinates in the world coordinate system comprises the following steps:
determining a second coordinate of each of the first coordinates projected onto the at least one first line segment;
determining the position relation between the at least one first line segment and each of the first coordinates based on the first coordinate and the second coordinate corresponding to the first coordinate;
determining, in response to all of the first coordinates being located on one side of the at least one first line segment, that the vehicle is not over the line as for the position relation between the lane line and the vehicle;
determining, in response to some of the first coordinates being located on one side of the at least one first line segment, that the vehicle is over the line as for the position relation between the lane line and the vehicle.

4. The method for detecting the position relation between the vehicle and the lane line according to claim 1, characterized in that the step of determining, according to the lane line image and the calibration parameter, at least one first line segment of the lane line mapped into the world coordinate system comprises the following steps:
determining two third coordinates in the world coordinate system according to the lane line image and the calibration parameter; and
determining the at least one first line segment according to the two third coordinates.

5. The method for detecting the position relation between the vehicle and the lane line according to claim 4, characterized in that the step of determining two third coordinates in the world coordinate system according to the lane line image and the calibration parameter comprises the following steps:
determining a recognition region according to the lane line image;
determining a second line segment in the recognition region by using Hough transform;
determining image pixel coordinates of two endpoints of the second line segment according to the second line segment; and
mapping the image pixel coordinates into the world coordinate system according to the calibration parameter to obtain the two third coordinates of the lane line in the world coordinate system.

6. The method for detecting the position relation between the vehicle and the lane line according to claim 5, characterized in that the step of determining a recognition region according to the lane line image comprises the following steps:

graying the lane line image to obtain a grayscale image;

filtering the grayscale image to obtain a noise reduction image;

performing distortion correction on the noise reduction image to obtain a corrected image;

performing edge detection on the corrected image to obtain image data; and substituting the image data into a recognition model to obtain the recognition region.

7. The method for detecting the position relation between the vehicle and the lane line according to claim 1, characterized in that before the step of determining the position relation between the lane line and the vehicle according to the position relation between the first line segment and the plurality of first coordinates in the world coordinate system, when at least one first line segment is multiple in quantity, the method further comprises:

calculating a first distance between the plurality of multiple first line segments and a fourth coordinate, the fourth coordinate being any point in the world coordinate system;

determining slopes of the plurality of multiple first line segments; and merging the two first line segments into a new first line segment in response to the difference between the slopes of any two first line segments being less than a first threshold and the difference between the first distances of the two first line segments being less than a second threshold.

8. A non-volatile computer-readable storage medium, characterized in that: the non-volatile computer-readable storage medium stores computer-executable instructions for causing a computer to execute the method for detecting the position relation between the vehicle and the lane line according to claim 1.

* * * * *